(12) United States Patent
Kolz

(10) Patent No.: US 7,210,920 B2
(45) Date of Patent: May 1, 2007

(54) SYSTEMS AND METHODS FOR BUILDING AN INTERLOCKING DECORATIVE HOUSE

(76) Inventor: Debra A. Kolz, 348 Homestead Trail, Grafton, WI (US) 53024

( * ) Notice: Subject to any disclaimer, the term of this patent is extended or adjusted under 35 U.S.C. 154(b) by 343 days.

(21) Appl. No.: 10/750,700

(22) Filed: Jan. 2, 2004

(65) Prior Publication Data

US 2004/0142063 A1 Jul. 22, 2004

Related U.S. Application Data

(60) Provisional application No. 60/437,708, filed on Jan. 2, 2003.

(51) Int. Cl.
*A21C 11/00* (2006.01)
(52) U.S. Cl. ............... 425/298; 426/104; 426/128; 426/512; 206/575; 99/426; 99/432
(58) Field of Classification Search ............... 425/298; 249/117, DIG. 1; 428/33; 426/104, 128, 426/512; 206/568, 575; 30/315, 316; 99/426, 99/432; 220/573.1, 912
See application file for complete search history.

(56) References Cited

U.S. PATENT DOCUMENTS

| | | | |
|---|---|---|---|
| 2,775,523 A | 12/1956 | Green | |
| 2,876,714 A | 3/1959 | Brown | |
| 3,311,069 A | 3/1967 | Underwood | |
| 4,156,516 A * | 5/1979 | Oliver | 249/53 R |
| 4,285,978 A * | 8/1981 | Quinlivan | 426/87 |
| 4,431,395 A | 2/1984 | Babos | |
| 5,579,582 A | 12/1996 | Carlson | |

FOREIGN PATENT DOCUMENTS

DE 27 03 900 A1 * 8/1978
DE 33 34 231 A1 * 4/1985

OTHER PUBLICATIONS

English Abstract for DE 27 03 900.*
English Abstracts for DE 33 34 231.*
Sugarcraft Cookie Decorating Tools custormer service internet web page; http://sugarcraft.com/catalog/cooky/cookiedeco.htm; dated Mar. 2001.*

* cited by examiner

*Primary Examiner*—Donald Heckenberg
(74) *Attorney, Agent, or Firm*—Ryan Kromholz & Manion, S.C.

(57) ABSTRACT

A special tabbed pattern is integrated into a series of forms. The forms may be cookie cutters adapted to cut baked dough or other material set to desired density to provide a series of panels corresponding to the cutters. Alternatively, the forms may be molds, e.g, adapted to receive melted chocolate which is allowed to cool and set to form a series of panels corresponding to the molds. The panels are adapted to be joined together to form a decorative structure. The tabs are sized and positioned to provide a dovetail joint along each edge of the structure. The protruding tabs or ends are of a slightly smaller dimension than the notches that they fit inside of to provide a secure fit. This self-interlocking design allows each individual piece of the structure to be fitted together, one at a time, while maintaining an acceptable degree of stability throughout the assembly process.

8 Claims, 16 Drawing Sheets

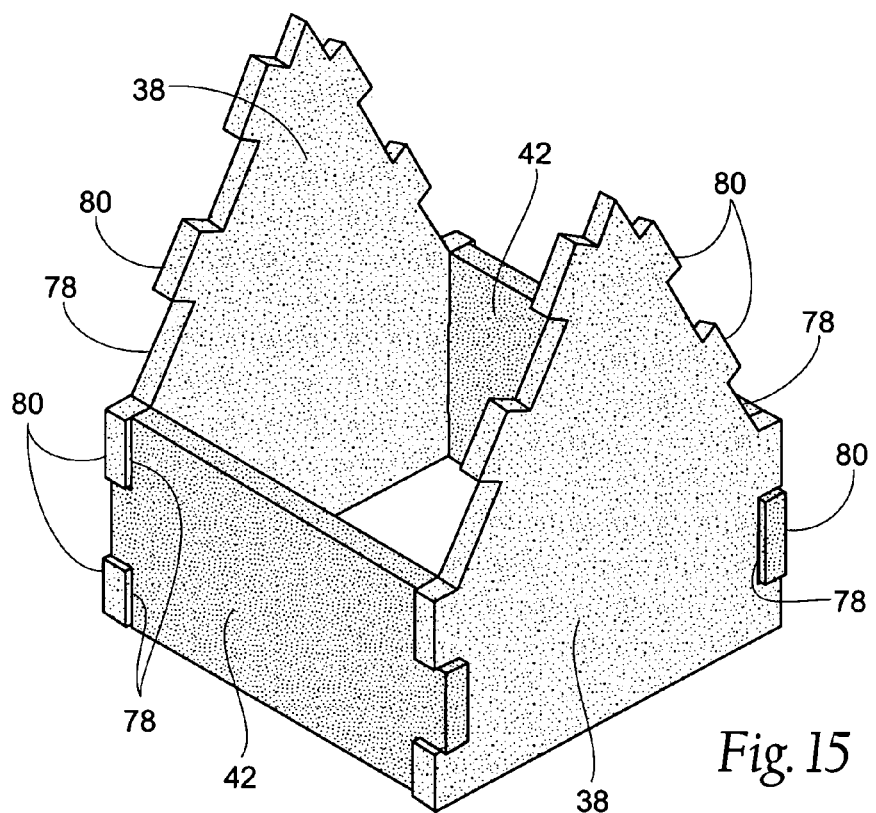
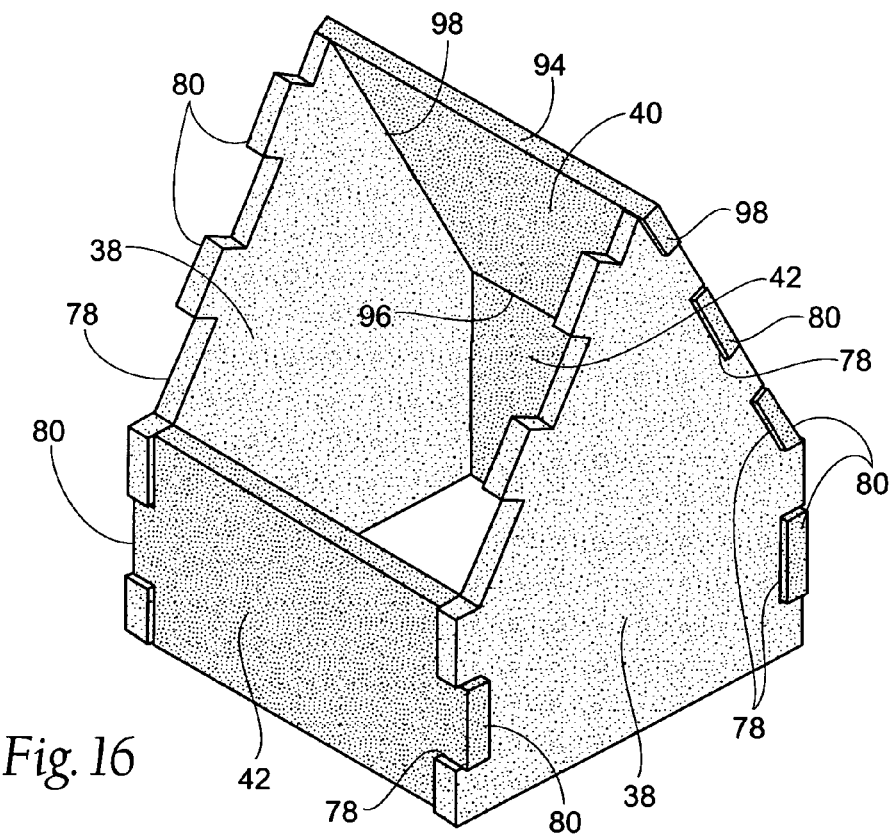

SYSTEMS AND METHODS FOR BUILDING AN INTERLOCKING DECORATIVE HOUSE

RELATED APPLICATIONS

This application claims the benefit of NOW ABANDONED provisional Application Ser. No. 60/437,708, filed Jan. 2, 2003, and entitled "Interlocking Assembly System and Related Methods for a Decorative House."

FIELD OF THE INVENTION

The invention relates to the construction of decorative houses.

BACKGROUND OF THE INVENTION

Decorative structures, particularly edible decorative structures, such as gingerbread houses, are well-known. Such structures are routinely made and displayed, especially for specially occasions, such as birthdays or Christmas. Children, in particular, enjoy participating in the decorating process. Historically, assembly of a gingerbread house has been an awkward and time-consuming task. Icing, in particular icings having an egg white base, such as royal icing, have traditionally been used to bond the individual panels of a structure together. The icing method is difficult to implement due to the amount of drying time required. Gingerbread house builders typically need a great degree of patience and may rely upon some sort of makeshift propping system to help stabilize the structure while the icing is setting. The icing assembly method can therefore be a frustrating experience for both adults and children. The frustration often limits enjoyment of the finished structure and may even prevent completion of the structure.

The need therefore remains for systems and methods for creating a decorative structure that are time and cost-efficient. The need further remains for systems and methods that permit ease of assembly while maintaining an acceptable degree of stability throughout the assembly process.

SUMMARY OF THE INVENTION

A special tabbed pattern is integrated into each joining panel of a decorative structure. The tabs are sized and positioned to provide a dovetail joint along each edge of the structure. The protruding tabs or ends are of a slightly smaller dimension than the notches that they fit inside of, thus providing a secure fit. This self-interlocking design allows each individual piece of the structure to be fitted together, one at a time, while maintaining an acceptable degree of stability throughout the assembly process.

According to one aspect of the invention, a device for creating an assembly of interlocking panels comprises a form having at least one side surface defining a tab and a notch and adapted to form a first panel having a corresponding tab and a corresponding notch. The tab of the first panel interlocks with a complementary notch on a second panel and the notch of the first panel interlocks with a complementary tab on a second panel to interlock the first and second panels. The form may take the form of a cutter, e.g., a cookie cutter, or a mold.

According to another aspect of the invention, an apparatus for creating a decorative house comprises a first form adapted to form an end panel for the house, a second form adapted to form a side panel for the house, and a third form adapted to form a roof panel for the house. In one embodiment, the end panel has a bottom surface, a pair of opposed side surfaces each having a tab and a notch, and a pair of inclined top surfaces each having a tab and a notch. The side panel has a top surface, a bottom surface, and a pair of opposed side surfaces. Each side surface has a tab and a notch. The side panel tab is complementary to and interlocks with the end panel notch on one of the side surfaces of the end panel. The side panel notch is complementary to and interlocks with the end panel tab on one of the side surfaces of the end panel. The roof panel has a top surface, a bottom surface, and a pair of opposed side surfaces. Each side surface has a tab and a notch. The roof panel tab is complementary to and interlocks with the end panel notch on one of the inclined top surfaces of the end panel. The roof panel notch is complementary to and interlocks with the end panel tab on one of the inclined top surfaces of the end panel.

According to another aspect of the invention, a kit for creating a decorative house comprises a form and a decorating material. The form has at least one side surface defining a tab and a notch and is adapted to cut a first panel for the house having a corresponding tab and a corresponding notch. The tab of the first panel interlocks with a complementary notch on a second panel and the notch of the first panel interlocks with a complementary tab on a second panel. In one embodiment, the kit further includes instructions for use. In another embodiment, the kit further includes at least one dough depth gauge. In still another embodiment, the kit further includes a dough mix. In another embodiment, the kit further includes chocolate adapted to be melted and poured into the form. In yet another embodiment, the kit further includes a cookie sheet having at least two raised edges sized and configured to serve as dough depth gauges.

Another aspect of the invention provides a kit for creating a decorative structure. The kit provides a plurality of premade or pre-cut panels and a decorating material. The panels provide a series of tabs and notches that are adapted to interlock the panels. In one embodiment, the kit comprises a pair of end panels, a pair of side panels, a pair of roof panels, and a decorating material. Each end panel has a bottom surface, a pair of opposed side surfaces each having a tab and a notch, and a pair of inclined top surfaces each having a tab and a notch. Each side panel has a top surface, a bottom surface, and a pair of opposed side surfaces, each side surface having a tab and a notch. Each roof panel has a top surface, a bottom surface, and a pair of opposed side surfaces, each side surface having a tab and a notch.

Another aspect of the invention provides a kit for creating a decorative structure. The kit comprises a plurality of edible panels. The panels provide a series of tabs and notches adapted to interlock the panels.

Another aspect of the invention provides a method of constructing a decorative structure. The method provides making a dough ball and manipulating the dough to a desired depth and configuration. The dough is baked and then cooled slightly to set the baked dough to a suitable density. At least two tabbed cookie cutters are pressed into the baked dough to cut out a series of corresponding tabbed panels. The tabbed panels are interlocked to assemble the structure.

According to yet another aspect of the invention, a method of constructing a decorative structure provides for melting chocolate to mold the chocolate to a desired depth and configuration. The chocolate is then cooled slightly to set the chocolate to a suitable density. A plurality of tabbed cookie cutters are pressed into the chocolate to cut out a series of corresponding tabbed panels. The tabbed panels are interlocked to assemble the structure.

Yet another aspect of the invention provides a method of constructing a decorative structure provides for melting chocolate. The melted chocolate is poured into each of a plurality of molds. Each mold has at least one side surface defining a tab and a notch and adapted to mold a first panel having a corresponding tab and a corresponding notch, the tab of the first panel interlocking with a complementary notch on a second panel and the notch of the first panel interlocking with a complementary tab on a second panel. The melted chocolate is cooled in the molds to set the chocolate into tabbed panels. The tabbed panels are removed from the molds and interlocked to assemble the structure.

BRIEF DESCRIPTION OF THE DRAWINGS

FIG. 15 is a perspective view illustrating the interlocking of a second end panel with the side panels.

FIG. 16 is a perspective view illustrating the interlocking of the roof panel with the end panels to rest the roof panel on a side panel.

DESCRIPTION OF THE PREFERRED EMBODIMENT

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

I. Interlocking Panels

Figure 1:
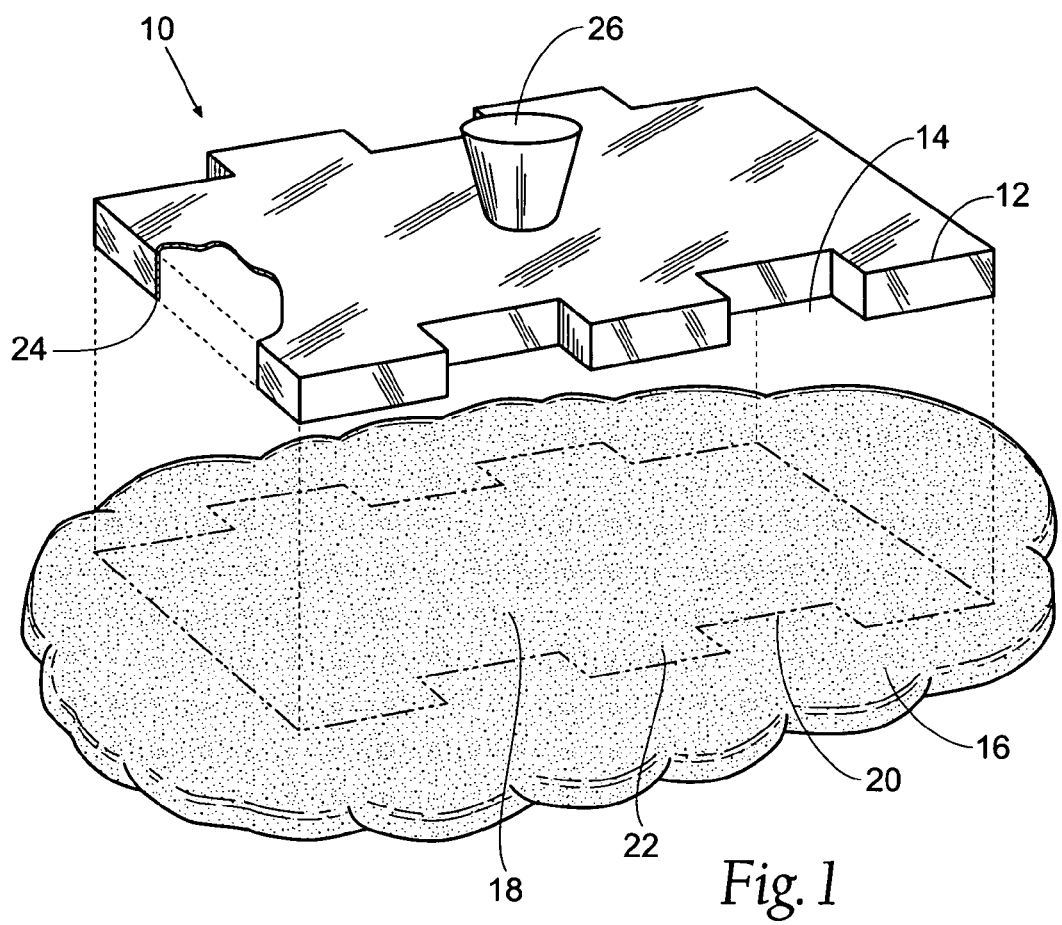
FIG. 1 is a perspective view illustrating the cutting of a cookie panel from a tabbed cookie cutter.

FIG. 1 illustrates a cookie cutter 10 providing a series of protruding ends or tabs 12 defining a series of notches 14. The cutter 10 is adapted to be pressed into a material or substance 16 to cut a panel 18 having a corresponding series of notches 20 and tabs 22. The material 16 may be baked cookie or various other types of edible materials, such as shortbread or solid chocolate. It is to be understood that the cutter 10 can be manufactured with a peripheral or outer cutting edge 24 suitable to accommodate varying densities of material 16, e.g., semi-set chocolate, baked cookie or dog biscuit. This eliminates the need to manufacture separate sets of cutters 10 for different materials 16, resulting in further cost savings. In one alternative embodiment, the panel 18 is made of dog biscuit material or other materials 16 edible by an animal. In some cases, it may be desirable for the panel 18 to be suitable for long-term display as a decoration. Therefore, it is contemplated that the panel 18 may be made from non-perishable and/or non-edible materials 16, e.g., clay or salt dough (which may be hardened or finished by drying or baking operation). It is further contemplated that the panels 18 may be formed of the same or of different materials 16. For example, a first panel 18 may be formed of gingerbread and a second panel 18 may be formed of shortbread.

The cutter 10 may be made of any suitable food safe material, e.g., 18 g stainless steel. Desirably, the cutter 10 includes a tab or knob 26 for easy grasping and manipulation.

The tab 22 of a first panel 18 is sized and configured to interlock with a complementary notch 20 on a second panel 18 and the notch 20 of the first panel 18 is sized and configured to interlock with a complementary tab 22 on the second panel 18 to form a series of interlocking panels 18.

Figure 2:
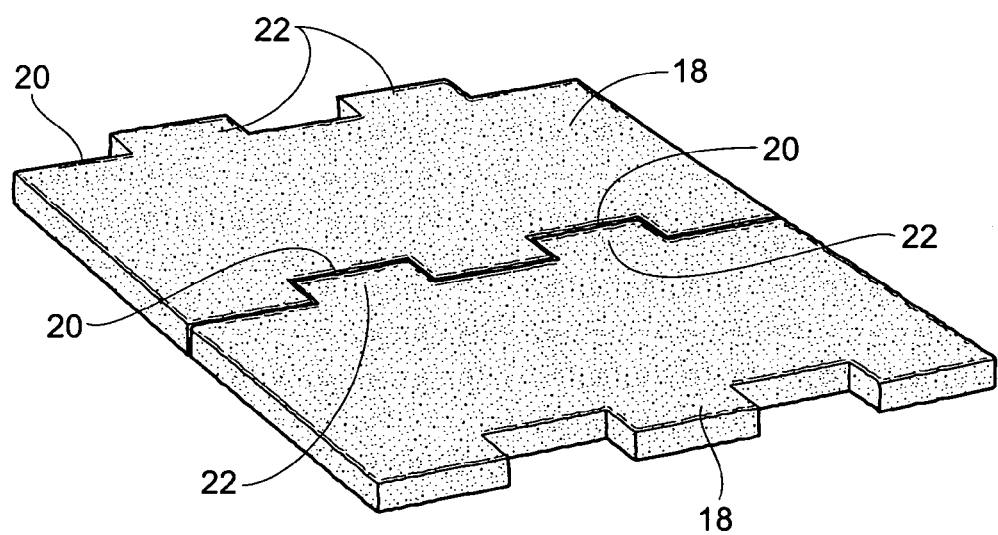
FIG. 2 is a perspective view illustrating the interlocking of a pair of tabbed cookie panels having the same configuration.
Figure 3:
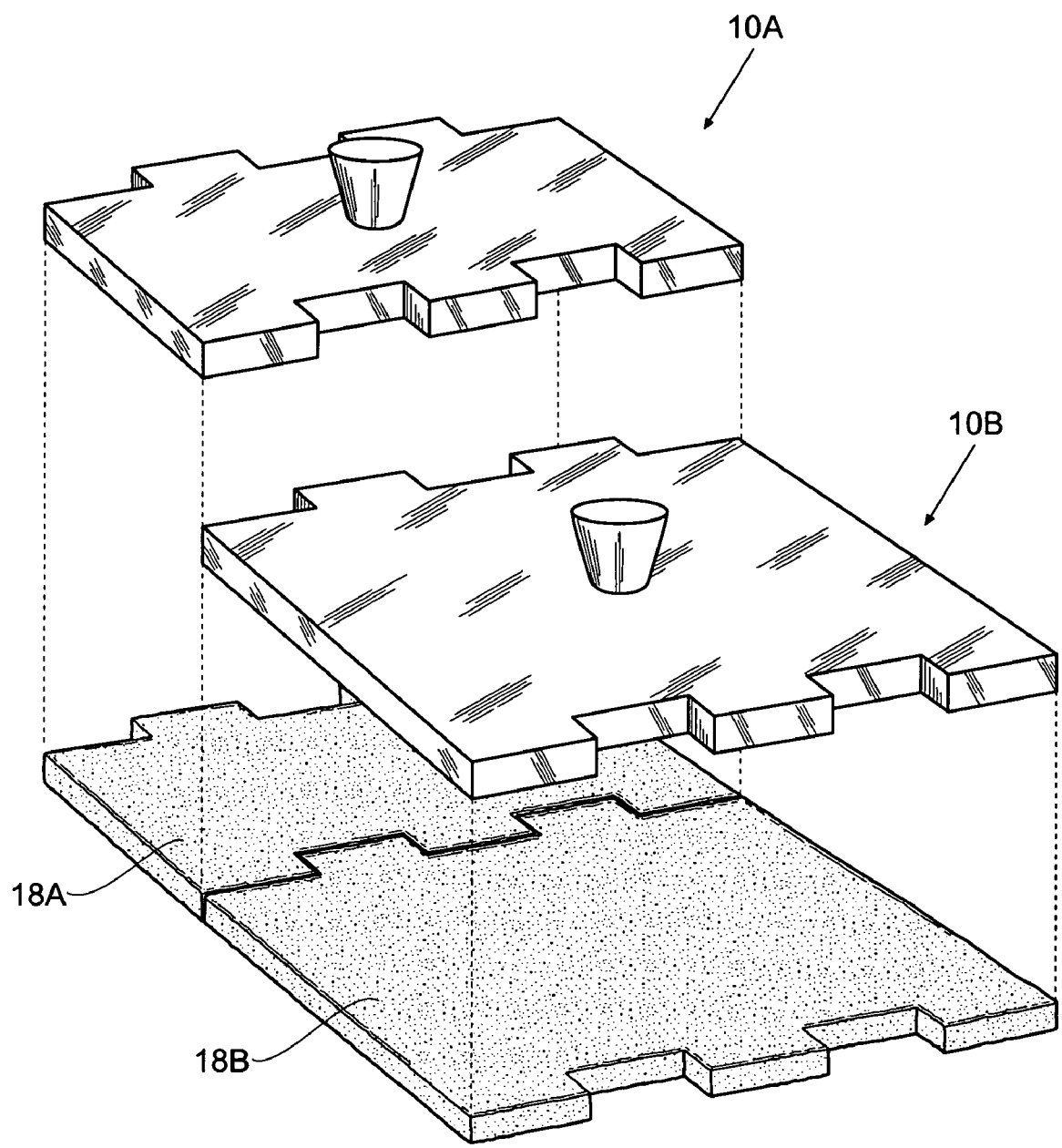
FIG. 3 is a perspective view illustrating the interlocking of a pair of tabbed cookie panels having different configurations.

In the embodiment shown in FIG. 2, a pair of panels 18 are formed from the same cutter 10 and have the same configuration, e.g., rectangular, with the panels 18 being joined in a planar pattern as shown in FIG. 2. In another embodiment, a first panel 18A is formed by a first cutter 10A. A second panel 18B is formed from a second cutter 10B having a different configuration than the first cutter 10A, e.g., the first cutter 10A has a rectangular configuration and the second cutter 10B has a square configuration, with the panels 18A and 18B being joined in a planar pattern as shown in FIG. 3.

The tabs or ends 22 are desirably of a slightly smaller dimension than the notches 20 that they fit inside of the notches 20, thus providing a secure fit, similar to a jigsaw puzzle. The cutter 10 may be provided in virtually any regular or irregular geometric size and shape. It is apparent that a series of cutters 10 of different configurations may be provided to form a series of corresponding panels 18 to create virtually any pattern.

II. Creation of a Decorative Structure Using A Series of Interlocking Panels

The interlocking assembly system may also be used in creating a variety of non-planar or three-dimensional structures. The system provides a custom engineered, self-supportive design that enables a person to easily join together the individual elements of the decorative structure. The system is particularly well suited for constructing an edible structure, e.g., a gingerbread house. Therefore, the system and methods will be described in accordance with the construction of an edible structure.

The interlocking assembly method may be offered to the consumer in the form of a "make it from scratch" kit or a "prepared, ready to assemble" kit, and may be integrated into any type of food-cutting or food-shaping apparatus that is used to create a food structure, particularly, a cookie house. A cutting or shaping apparatus that utilizes the interlocking assembly method may be provided in virtually any regular or irregular geometric size and shape so that the components of the structure, when assembled, may resemble any type of structure or building, such as a house.

Figure 4:
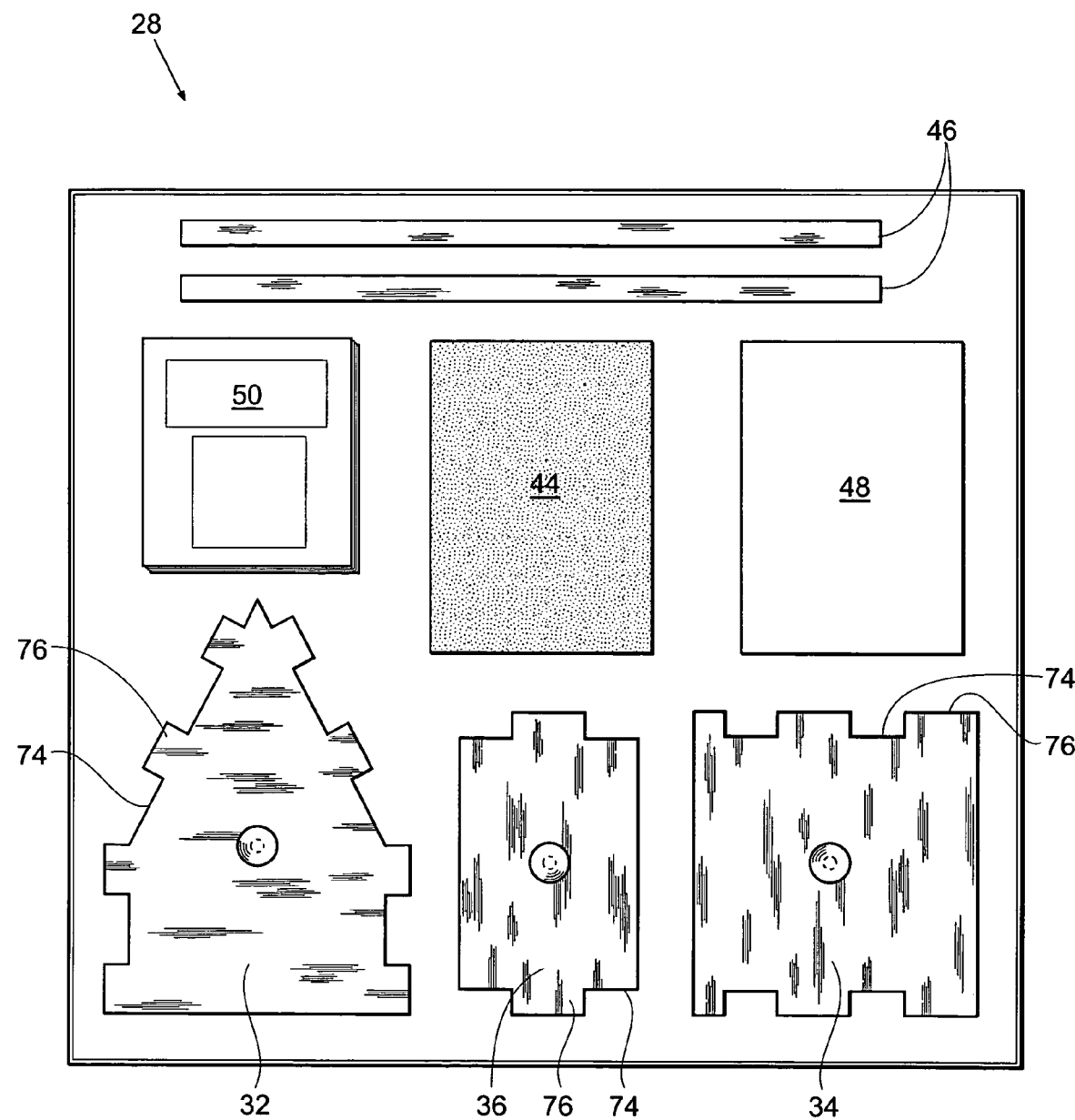
FIG. 4 is a perspective view of a make it from scratch baking kit for making a decorative structure.
Figure 17:
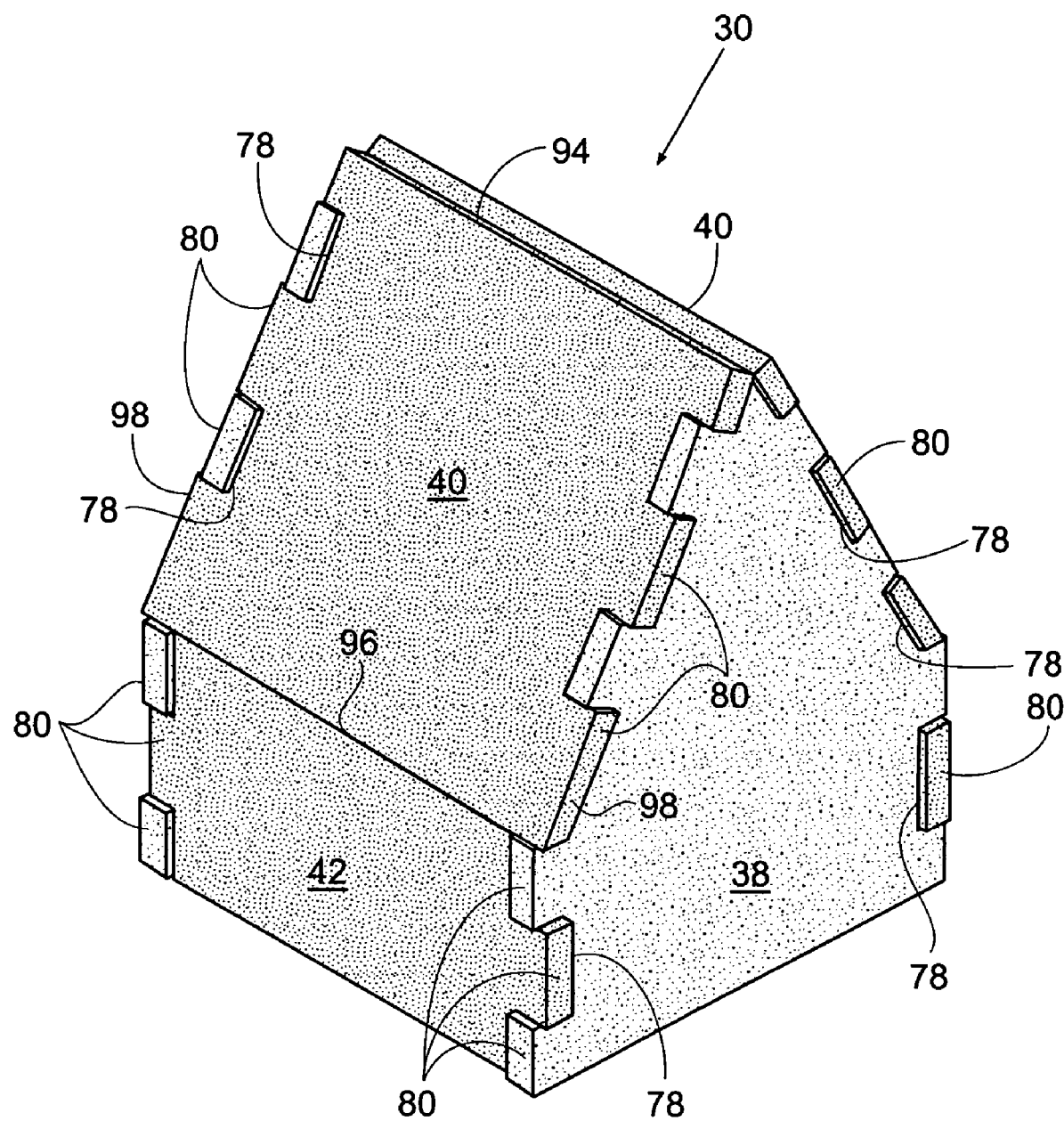
FIG. 17 is a perspective view illustrating the interlocking of a second roof panel with the end panels to rest the second roof panel on the second side panel to complete assembly of the structure.

FIG. 4 shows a "make it from scratch" baking kit 28 for constructing a decorative structure, e.g., a house 30 (see also FIG. 17). The food structure 30 is not necessarily limited to a specific flavor or substance such as gingerbread cookie, but may include various other types of edible materials, such as shortbread or solid chocolate. In one alternative embodiment, the structure 30 is made of dog biscuit material or other materials edible by an animal. In some cases, it may be desirable for the structure 30 to be suitable for long-term display as a decoration. Therefore, it is contemplated that the structure 30 may be made from non-perishable and/or non-edible materials, e.g., clay or salt dough (which may be hardened or finished by baking operation).

The kit 28 provides an end panel cookie cutter 32, a roof panel cookie cutter 34, and a side panel cookie cutter 36. Cutters 32/34/36 act as a form for creating, respectively, a pair of end panels 38, a pair of roof panels 40, and a pair of side panels 42, as will be described in detail later (see also FIG. 6). Panels 38/40//42 may variously sized to produce a structure 30 of an infinite variety of dimensions. The kit 28 may also include mix 44, a pair of gauges 46, decorating material 48, and instructions for use 50. If desired, the kit 28 may also include a variety of additional items to further facilitate the creation, storage and/or transport of the structure 30. Such items include, but are not limited to, bakery parchment paper to provide a working surface, a plate or platform (e.g., cardboard) for displaying and/or transporting the assembled structure 30, a bag (e.g., plastic) for wrapping the finished decorated structure 30 for storage or transport, and a box, which may take the shape of a house complementary to the shape of the finished structure 30, or other storage or gift container sized to receive the assembled structure 30 (not shown). The kit 28 greatly streamlines the entire process of creating a gingerbread house 30 from scratch. The planning step is therefore minimal and cost effective, as the kit 28 supplies a design to follow, and includes most of the baking and decorating ingredients necessary for execution, with the exception of a few fresh items.

In some cases, the cook or baker may wish to provide his or her own recipe. Desirably, a specially formulated recipe is provided, with at least some of the ingredients supplied as part of the kit 28 in the form of mix 44. For example, in one embodiment, the mix 44 provides pre-measured dry ingredients, e.g., flour, sugar, and spices. The baker need only add a few fresh ingredients, much like a dry cake mix from the supermarket. Fresh ingredients may include, but are not limited to, eggs, molasses, and butter. The custom-blended, pre-packaged, dry cookie mix 44 eliminates the need to have the required dry ingredients on hand, as well as the need to measure and blend each ingredient accordingly. The cookie mix 44 may be provided in any desired type or flavor, e.g., gingerbread, chocolate, shortbread. To maximize cost efficiency, the mix 44 may also be sold or provided separately from kit 28 to permit reuse of other kit 28 components.

Figure 5:
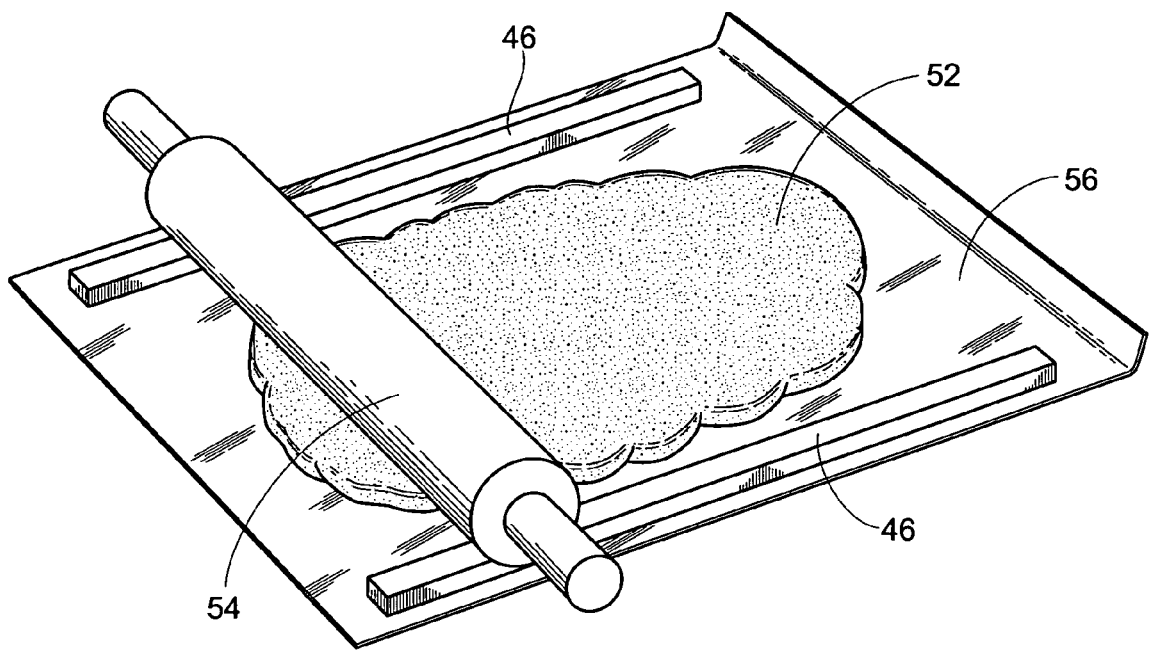
FIG. 5 is a top view illustrating the use of a pair of dough gauges to roll a ball of dough on a cookie sheet to a uniform desired thickness.

With reference now to FIG. 5, the baker adds the fresh ingredients to the mix and mixes to form a batter or dough 52. The recipe is formulated to provide dough 52 of proper texture and consistency at room temperature. Therefore, the specially-formulated recipe results in additional time-savings because there is no chilling required. The recipe is desirably also formulated to yield a quantity of baked dough 52 greater than what is required to create the featured structure 30, thereby providing extra baked material 16 as additional treats to sample and eat. The specially formulated recipe also provides panels 38/40/42 of the stability necessary to successfully join the individual panels 38/40/42 securely together, in addition to supporting the weight of the icing and confectionary products when fully decorated.

As seen in FIG. 5, the dough 52 is placed between the gauges 46 and partially flatted by hand. A conventional rolling pin 54 or other suitable device is then rolled simultaneously across the dough 52 and the gauges 40 to roll or flatten the dough 52 to a desired thickness that essentially corresponds to the height of the gauges 40 and those dimensions of the cookie cutters 32/24/36 that are integral to properly being able to interlock the individual panels 38/40/42 together.

It is to be understood that the gauges 40 and cutters 32/24/36 are specifically engineered to work together to ensure that the required thickness is established and evenly maintained from panel 32/24/36 to panel 32/24/36, therefore guaranteeing that the baked, cutout panels 32/24/36 fit properly together. The dough 52 may be flattened and rolled directly on a greased cookie sheet 56. The cookie sheet 56 becomes the work surface, rather than a bread board or counter, making clean-up easier and quicker.

The gauges 46 enable the baker to roll the dough 52 a uniform desired thickness. The desired thickness may vary by the material being used. For example, in a representative embodiment, the dough 52 is gingerbread dough rolled approximately ⅜ inch thick.

The gauges 46 may be variously constructed. The size and configuration of the gauges 46 may be customized, e.g., for use with different types of dough 52 and for specific baking operations. In the illustrated embodiment, the gauges 46 take the form of a pair of elongated rectangular rods. The gauges 46 may be made of any suitable food safe material, e.g., wood, metal, plastic. In a preferred embodiment, the gauges 46 are made of a food safe acrylic material that is washable to permit reuse. The gauges 46 are desirably built to a specified height to consistently roll the dough 52 to a uniform desired thickness. In a representative embodiment, each gauge 46 is 12 inches long, ³⁄₁₆ to ⁴⁄₁₆ inch high and ½ inch wide.

Figure 6:
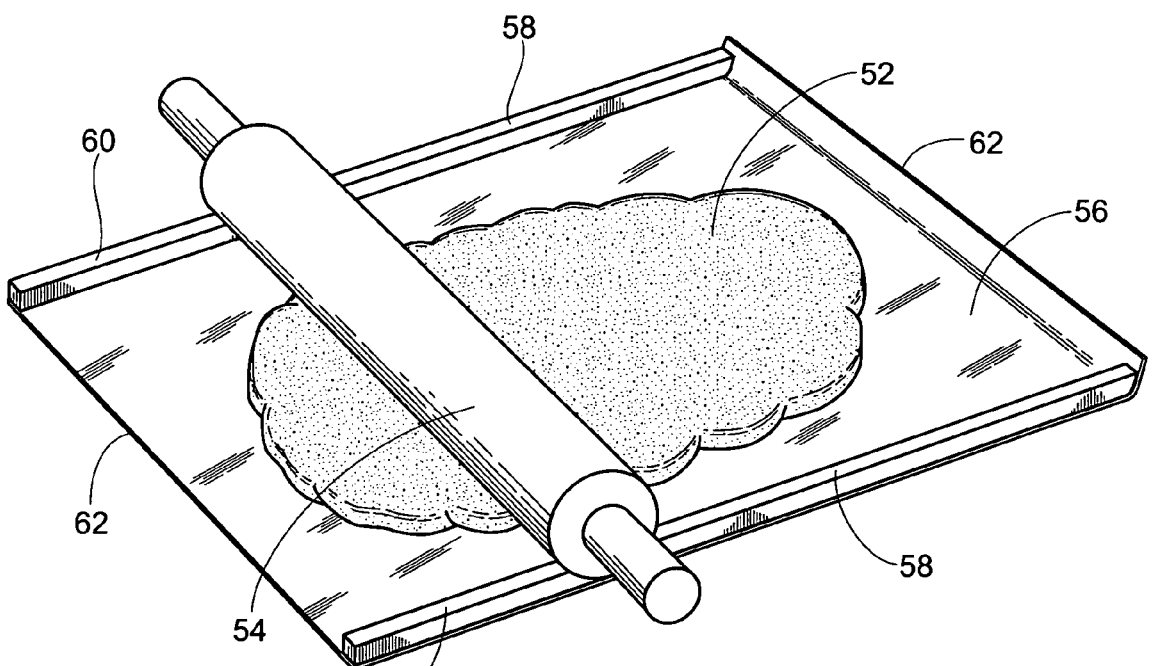
FIG. 6 is a perspective view of an alternative embodiment in which the cookie sheet includes raised edges.

In an alternative embodiment, seen in FIG. 6, cookie sheet 56 includes raised, depth control edges 58 along long sides 60 of the cookie sheet 56. Edges 58 are similar to gauges 46, but are formed integral with the cookie sheet 56 to enable the baker to roll the dough 52 to a uniform desired thickness. The depth of the edges 58 corresponds to the desired thickness, which may vary by the material being used. If desired, edges 58 may also be included along short sides 62 of the cookie sheet 56 (not shown). In one embodiment, cookie sheet 56 with raised edges 58 is provided to the consumer as part of kit 28. In this embodiment, gauges 46 could be omitted from the kit 28.

The rolled dough 52 is baked as rough, oversized shapes at the temperature and time period instructed. The specified time and temperature will vary according to the type of dough 52 being used, as well as the type and size of cookie sheet 56 being used. The dough 52 is set or hardened to a cookie by the baking operation.

Figure 7:
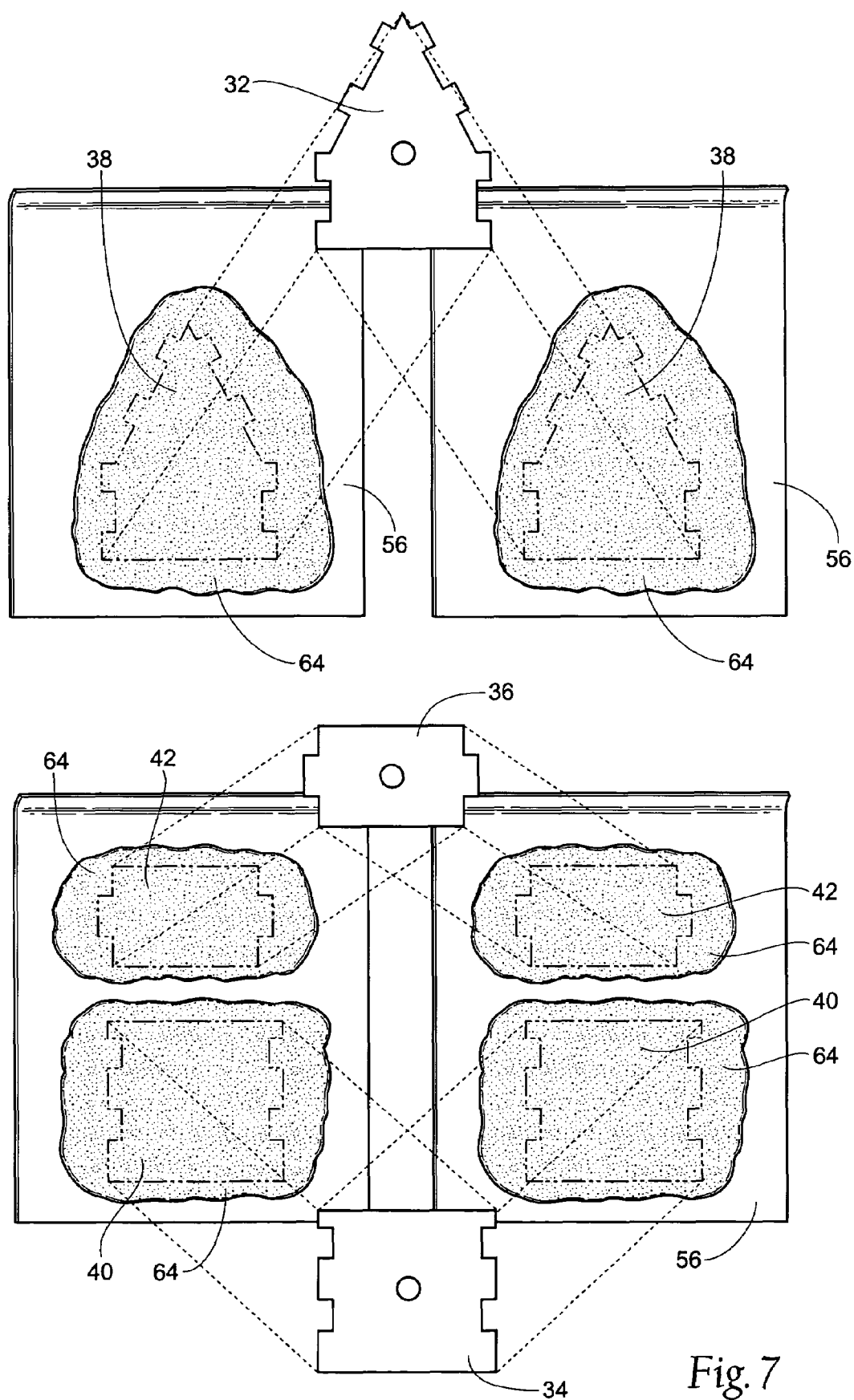
FIG. 7 is a top view illustrating the layout on cookie sheets of a series of panels required to assemble a decorative structure.

With reference to FIG. 7, the baked cookie 58 is allowed to slightly cool and set. End panel cutter 32 is pressed into the slightly cooled cookie 58 at two different locations to form a pair of end panels 38. Similarly, a pair of roof panels 40 are formed from roof panel cutter 34 and a pair of side panels 42 are formed from side panel cutter 36. Cutting the panels 38/40/42 from the baked cookie 58 rather than unbaked dough 52 (which undergoes expansion during the baking process) assures that the panels 38/40/42 will be of a consistent size, thereby assuring a proper interlocking fit between the assembled panels 38/40/42. Leftover cookie 58 after cutting of the panels 38/40/42 can be eaten and enjoyed.

Figure 8:
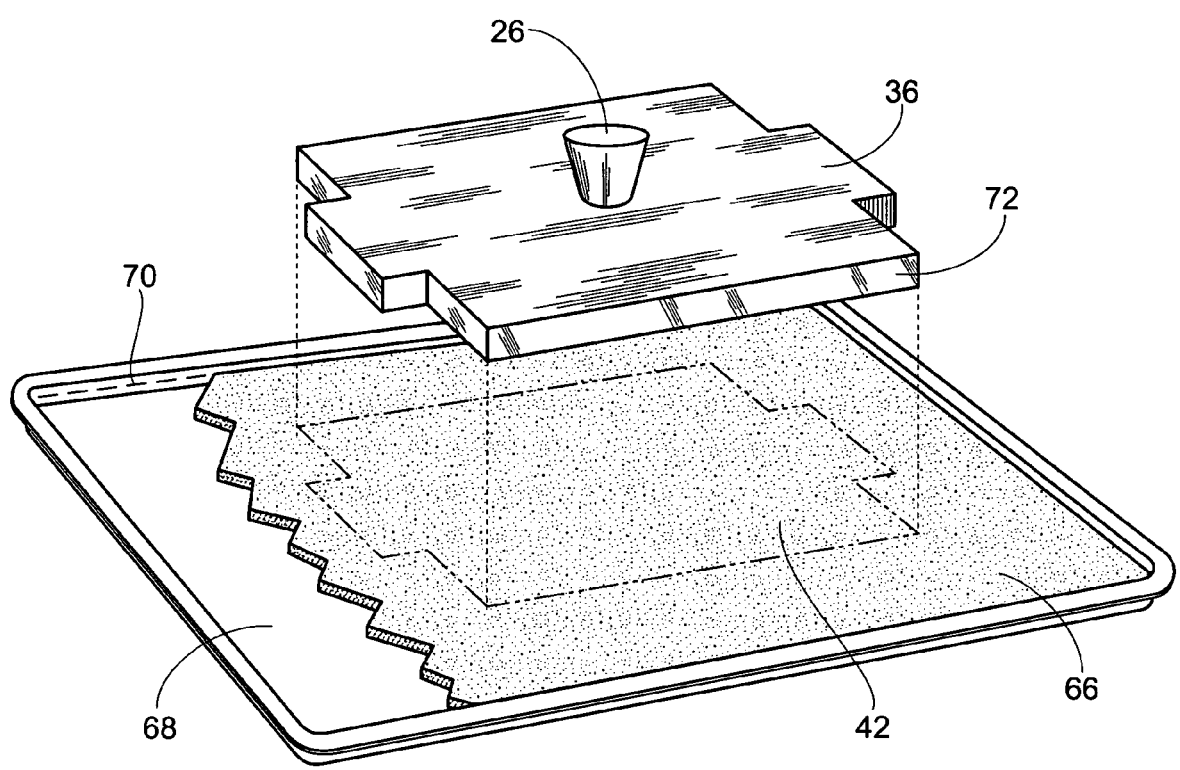
FIG. 8 is a perspective view illustrating the use of a lined pan to mold melted chocolate to a desired length, width and height.

In one alternative embodiment, seen in FIG. 8, solid chocolate 66 may be used to create a structure 30. In this example, the chocolate 66 (which has desirably been previously melted) is poured into a buttered or lined baking pan 68 to first mold the chocolate 66 into a length, width and height suitable for the size of structure 30 that is being created. The pan 68 may be formed of any suitable food safe material, e.g., stainless steel, to permit easy cleaning and reuse. Once the chocolate 66 has semi-set to the correct hardness, the cutters 32/34/36 are pressed into the chocolate 66 to form the panels 38/40/42 of the structure 30. The pan 68 may include a fill line 70 to assure that the chocolate 66 is poured to uniform, desired depth. In this embodiment, kit 28 would include pan 68, chocolate 66, decorating materials 48, cutters 32/34/36, and instructions 50. Mix 44 and gauges 46 could be omitted from the kit 28.

Figure 9:
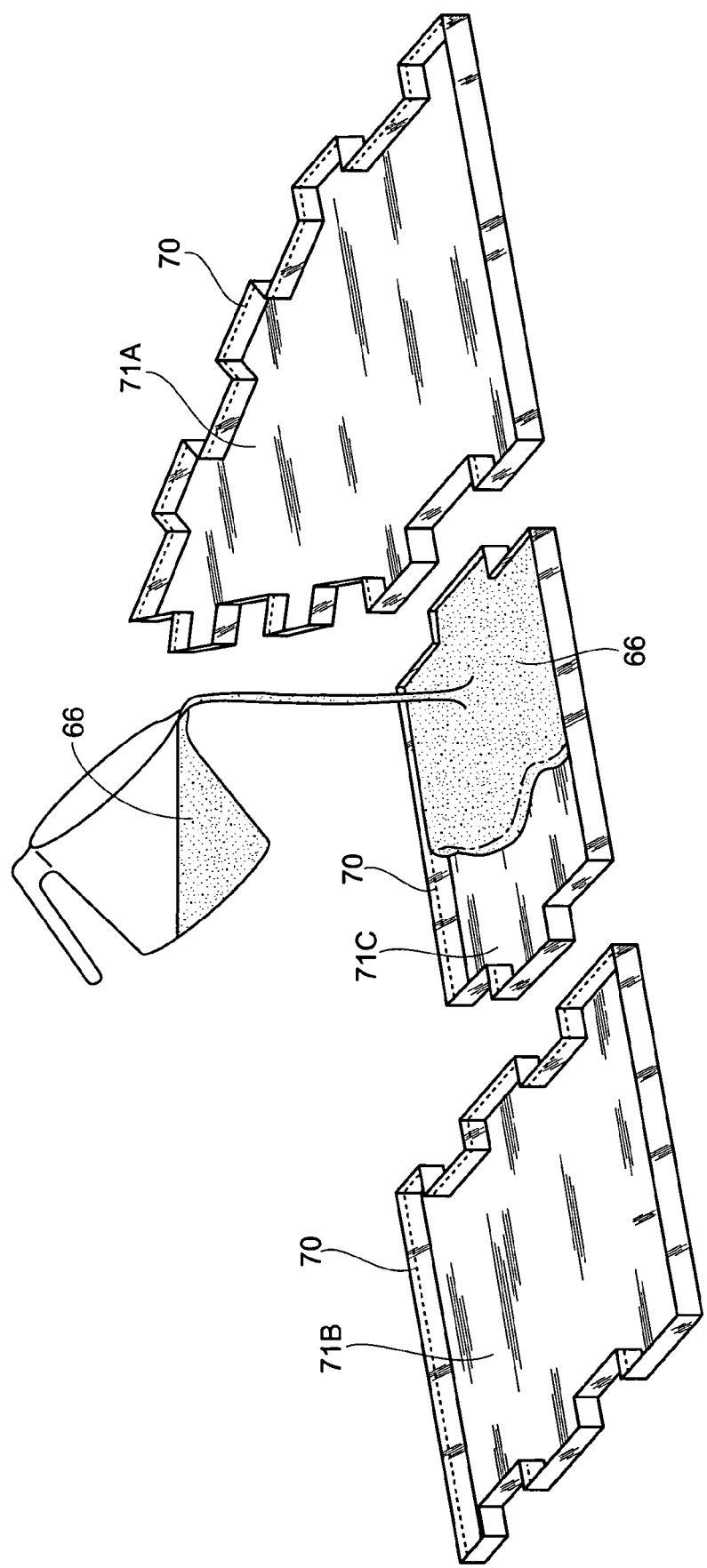
FIG. 9 is a perspective view illustrating the use of a series of molds to mold melted chocolate into desired panels.

Alternatively, instead of pan 68, melted chocolate 66 may be poured into a series of chocolate molds, eliminating the need for cutters 32/34/36. As seen in FIG. 9, melted chocolate 66 is poured into each of an end panel mold 71A, a roof panel mold 71B, and a side panel mold 71C and allowed to set. The molds 71A/71B/71C function as an alternative form to cutters 32/32/36 to form panels 38/40/42 respectively. The molds 71A/71B/71C include a series of notches 74A and tabs 76A similar to notches and tabs 74 and 76 of cutters 32/34/36. Desirably, the molds 71A/71B/71C include a fill line 70 to assure uniform depth. The panels 38/40/42 are then removed from the respective molds 71A/71B/71C. The molds 71A/71B/71C may be formed of any suitable material, e.g., food safe plastic, to permit easy cleaning and reuse. In this embodiment, kit 28 would include molds 71A/71B/71C, chocolate 66, decorating materials 48, and instructions 50. It may be desirable to provide a pair each of end panel molds 71A, roof panel molds 71B, and side panel molds 71C so that the necessary panels (two end panels 38, two roof panels 40, and two side panels 42) may be made concurrently, resulting in additional time savings.

Each cutter 32/34/36 may include a knob 26, e.g., ¼ inch diameter, centered on cutter 32/34/36, for easy grasping as previously described. Desirably, the outer edges of the cutters 32/34/36 include a bend down of approximately 90° to form a peripheral cutting surface 72 (see FIG. 8). In a representative embodiment, the cutters 32/34/36 are approximately ¾ inch in depth to readily accommodate a variety of baked cookie 58 depths. Each cutter 32/34/36 desirably provides a series of complementary notches 74 and protruding ends or tabs 76 along at least one outer edge of the cutter 32/34/36 (see FIG. 4). The corresponding panels 38/40/42 provide a corresponding series of perimeter notches 78 and tabs 80 which interlock to secure the individual panels 38/40/42 together to create the structure 30 (see FIG. 16). The tabs 80 are of a slightly smaller dimension than the notches 78 that they fit inside of, thus providing a secure fit. The size, number, and placement of tabs 76/80 and notches 74/78 may be varied, particularly as to size of the panels 38/40/42, to assure stability of the assembled structure 30. In the illustrated embodiment, tabs 76 and notches 74 are of a generally rectangular configuration. It is contemplated, however, that tabs 76 and notches 74 may be variously configured, e.g., rounded or other curvilinear configuration (not shown). The self-supporting, interlocking arrangement does not require an icing or other "glue" to act as an adhesive.

Figure 10:
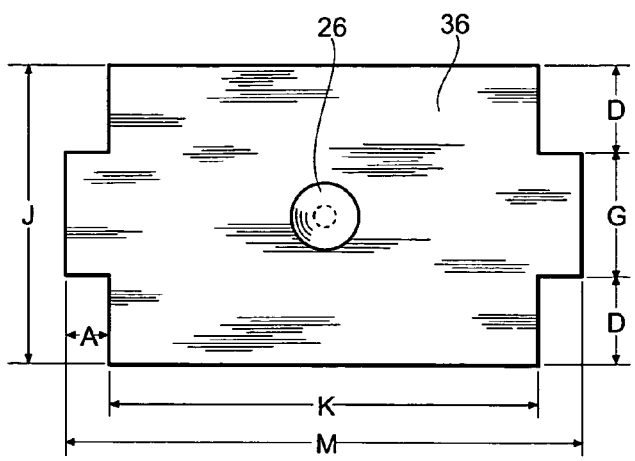
FIG. 10 is a schematic illustrating the dimensions of a side panel cutter in a representative embodiment.
Figure 11:
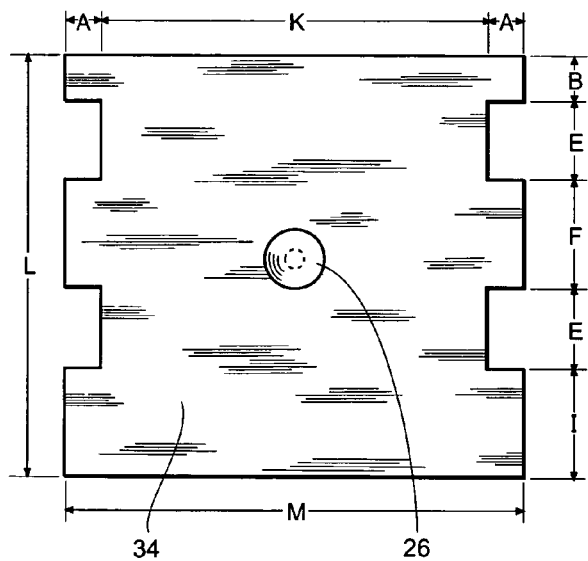
FIG. 11 is a schematic illustrating the dimensions of a roof panel cutter in a representative embodiment.
Figure 12:
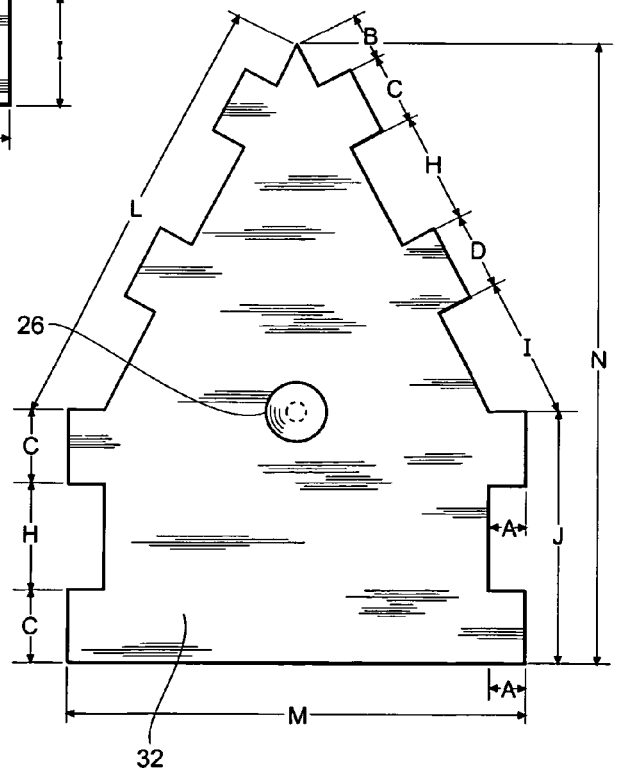
FIG. 12 is a schematic illustrating the dimensions of an end panel cutter in a representative embodiment.

FIGS. 10–12 illustrate inner dimensions A–N for the cutters 32/34/36 (or molds 71A/71B/71C) in a representative embodiment as follows:

| | |
|---|---|
| A | ½ inch |
| B | ⅝ inch |
| C | 1 inch |
| D | 1¹⁄₃₂ inches |
| E | 1¹⁄₁₆ inches |
| F | 1¹³⁄₃₂ inches |
| G | 1⁷⁄₁₆ inches |
| H | 1½ inches |
| I | 1¹⁷⁄₃₂ inches |
| J | 3½ inches |
| K | 5 inches |
| L | 5¹¹⁄₁₆ inches |
| M | 6 inches |
| N | 8⅝ inches |

When dimensioned according to the above representative embodiment, four standard size 14 in.×16 in cookie sheets 56 can accommodate the necessary panels (two end panels 38, two roof panels 40, and two side panels 42) in the arrangement illustrated in FIG. 7. However, most standard ovens will not readily accommodate four cookie sheets 56 at one time and therefore at least two baking operations may be required. Alternatively, one professional size 13½ in.×17 in cookie sheet 56 can accommodate one end panel 38, one roof panel 40, and one side panel 42. In this arrangement, only two cookie sheets 56 are required. The two cookie sheets 56 are readily accommodated in most standard ovens, cutting baking time in half and reducing cleanup.

This above-described sequence of baking steps, in conjunction with the use of furnished ingredients and prepping equipment will provide easy and successful creation and assembly. The interlocking assembly method provides the means for a baker to easily create and assemble an edible structure 30 that they have made from scratch. The tabbed pattern allows each individual panel 38/40/42 of the structure 30 to be fitted together, one at a time, while maintaining an acceptable degree of stability throughout the assembly process.

Figure 13:
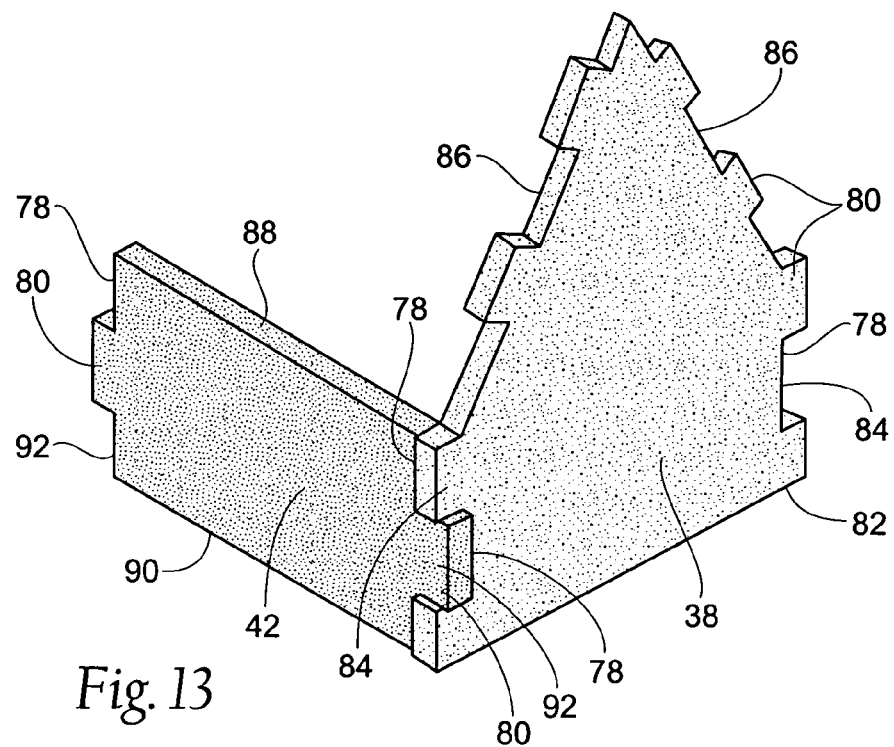
FIG. 13 is a perspective view illustrating the interlocking of a side panel with an end panel.

In assembling the structure 30, a side panel 42 is interlocked with an end panel 38, as shown in FIG. 12. The end panel 38 includes a bottom surface 82, a pair of side surfaces 84, and a pair of inclined top surfaces 86. The side panel 42 is generally rectangular-shaped and includes a top surface 88, a bottom surface 90, and a pair of side surfaces 92. As FIG. 13 shows, each side surface 92 of side panel 42 carries a tab 80 sized and configured to interlock with a complementary notch 78 on a side surface 84 of an end panel 38 to interlock the side and end panels 42 and 38.

Figure 14:
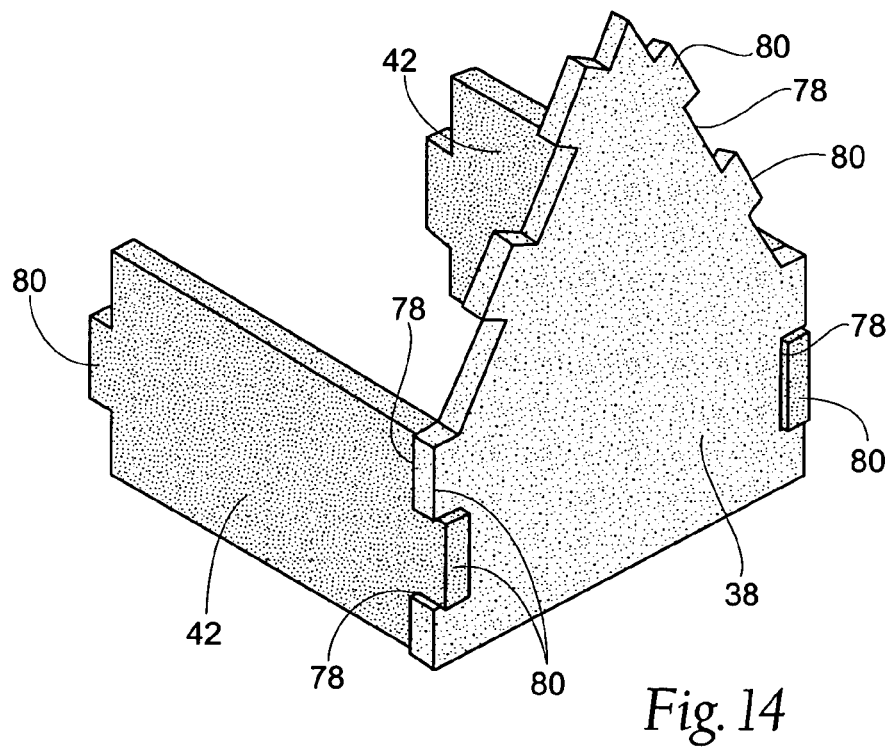
FIG. 14 is a perspective view illustrating the interlocking of a second side panel with the end panel.

In a similar manner, the second side panel 42 is then interlocked with the end panel 38, as shown in FIG. 14. The interlocking design provides sufficient stability to the semi-assembled structure without the aid of icing, hands, or props. As seen in FIG. 15, a second end panel 38 is interlocked with the pair of side panels 42.

As FIG. 16 shows, the four base panels (two side panels 42 and two end panels 38) easily accept and support a roof panel 40. The roof panel 40 is generally square-shaped, having a top surface 94, a bottom surface 96, and a pair of side surfaces 98. Each side surface 98 carries a series of tabs 80 and notches 78 that interlock with complementary notches 78 and tabs 80 on inclined top surfaces 86 of end panels 38 to interlock roof and end panels 40 and 38. The bottom surface 96 of the roof panel 40 is sized and configured to abut the top surface 88 of the adjacent side panel 42. In a similar manner, the second side panel 40 is then interlocked with the end panels 38 to complete assembly of the structure 30, as shown in FIG. 17. The assembled structure 30 remains completely self-supportive.

The assembled structure 30 is then decorated as desired. Preferably, suggested designs are included in the instructions 50 for the consumer's reference. The decorating step can be an expensive one as several types of packaged confectionary products are typically purchased to achieve greater detail and uniqueness in the finished product. Therefore, the kit 28 desirably includes the decorating accessories 48, thereby greatly simplifying the process as well as making it more cost-effective. The decorating accessories may include a variety of confectionary products, such as icing (e.g., microwavable chocolate), nuts, coconut, cookies, etc. The icing serves to further bond the panels 38/40/42 together, thereby providing additional stability to the finished structure 30.

Figure 18:
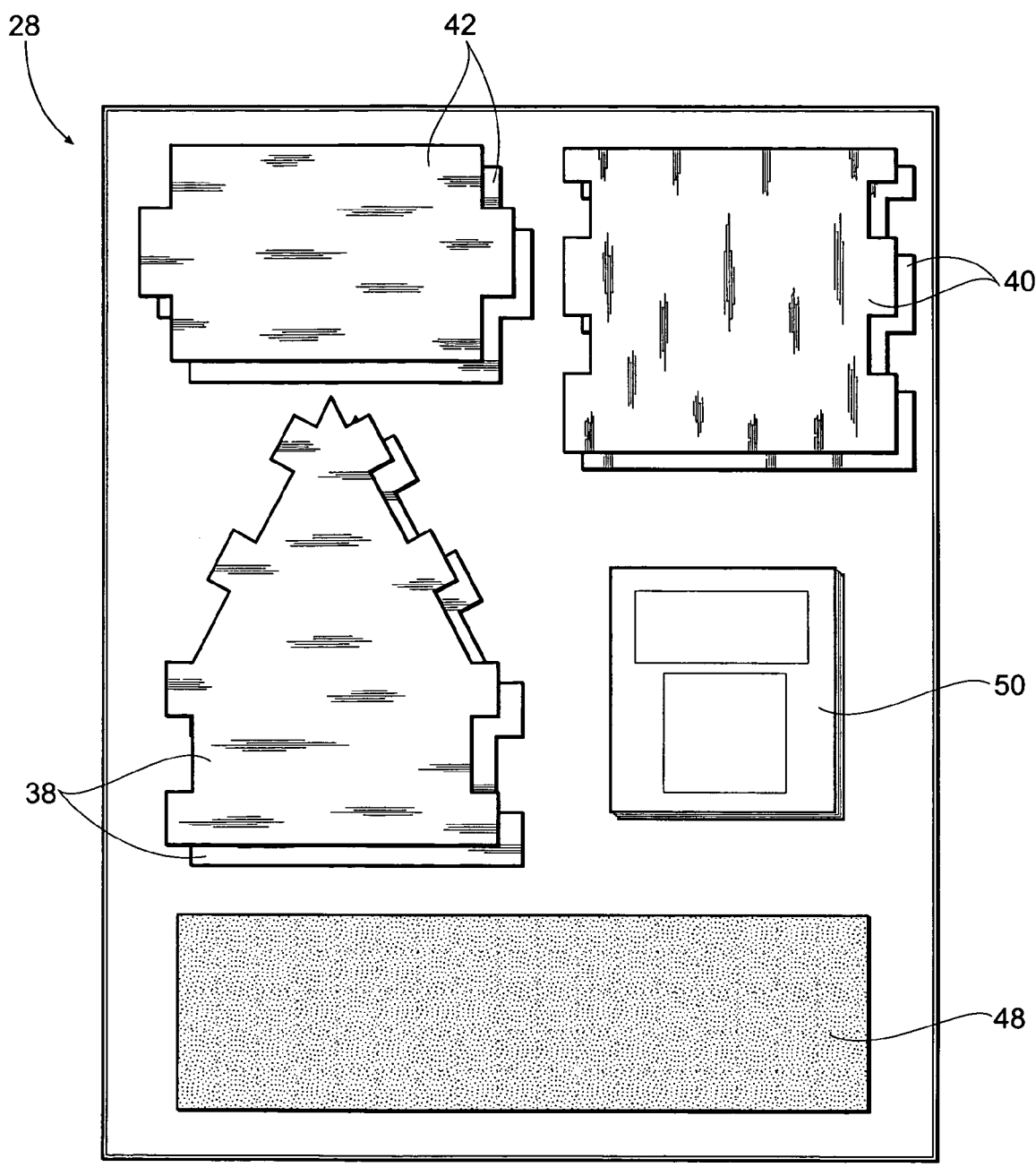
FIG. 18 is a perspective view of a ready to assemble decorating kit for making a decorative structure.

Non-bakers or those short on time may wish to place greater emphasis upon the decorating process. Children, in particular, will derive a great entertainment value from the assembly and decorating process alone. Therefore, a series of pre-baked and pre-cut panels 38/40/42, which may be cookie, solid chocolate or some other type of edible or non-edible substance as previously noted, may be provided to the consumer in the form of a "prepared, ready to assemble" decorating kit 28A, shown in FIG. 18. The panels 38/40/42 may be pre-cut by a series of cutters 32/34/36. Alternatively, the panels 38/40/42 may be cut by any other suitable method providing sufficiently precise results, e.g., a water jet. By eliminating the baking process, the pre-cut panels 38/40/42 allow the consumer to focus on the assembly and decorating process. The kit 28A preferably includes decorating materials 48 and instructions 50 for use, as previously described. The pre-cut panels 38/40/42 are assembled with ease as previously described to form the structure 30. The structure 30 is then decorated as desired. By eliminating the need to purchase a variety of individual decorating materials 48, the decorating kit 28A greatly streamlines the entire decorating process.

Figure 19:
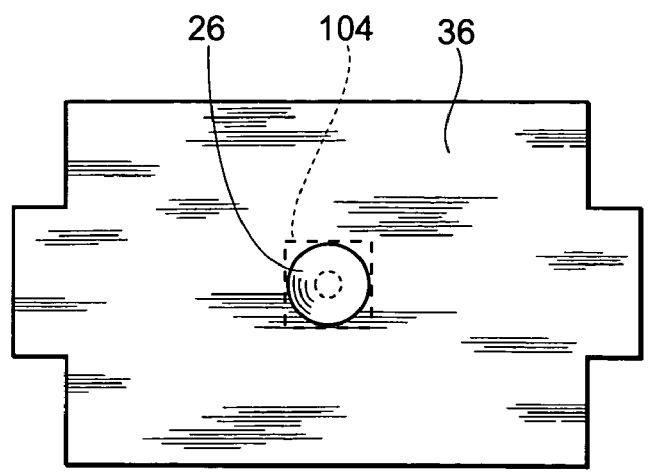
FIG. 19 is a top view of an alternative embodiment of a side panel cutter in which the cutter includes a window cutting surface.
Figure 20:
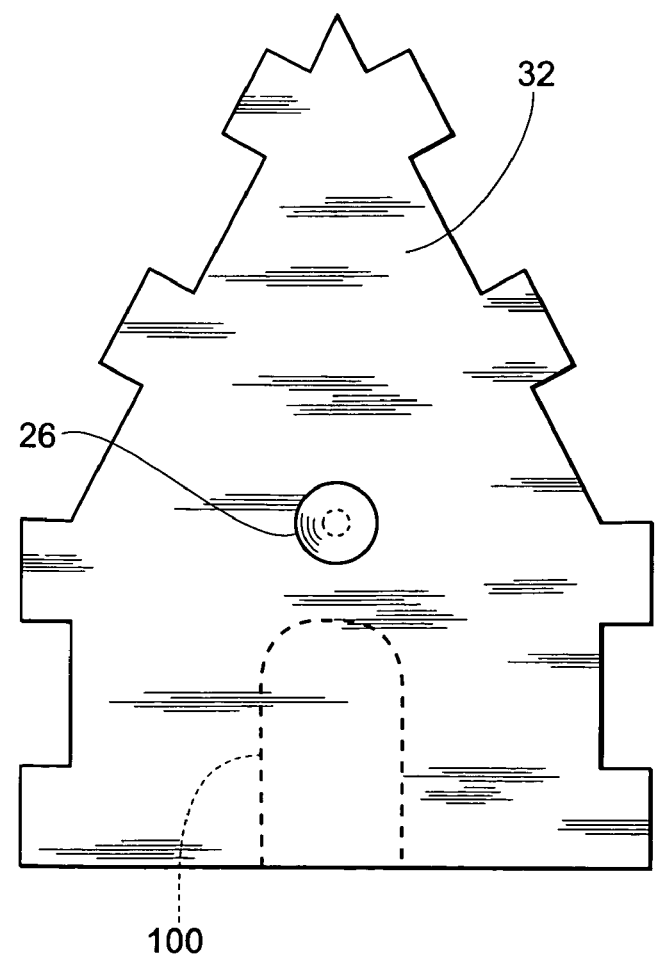
FIG. 20 is a top view of an alternative embodiment of an end panel cutter in which the cutter includes a door cutting surface.
Figure 21:
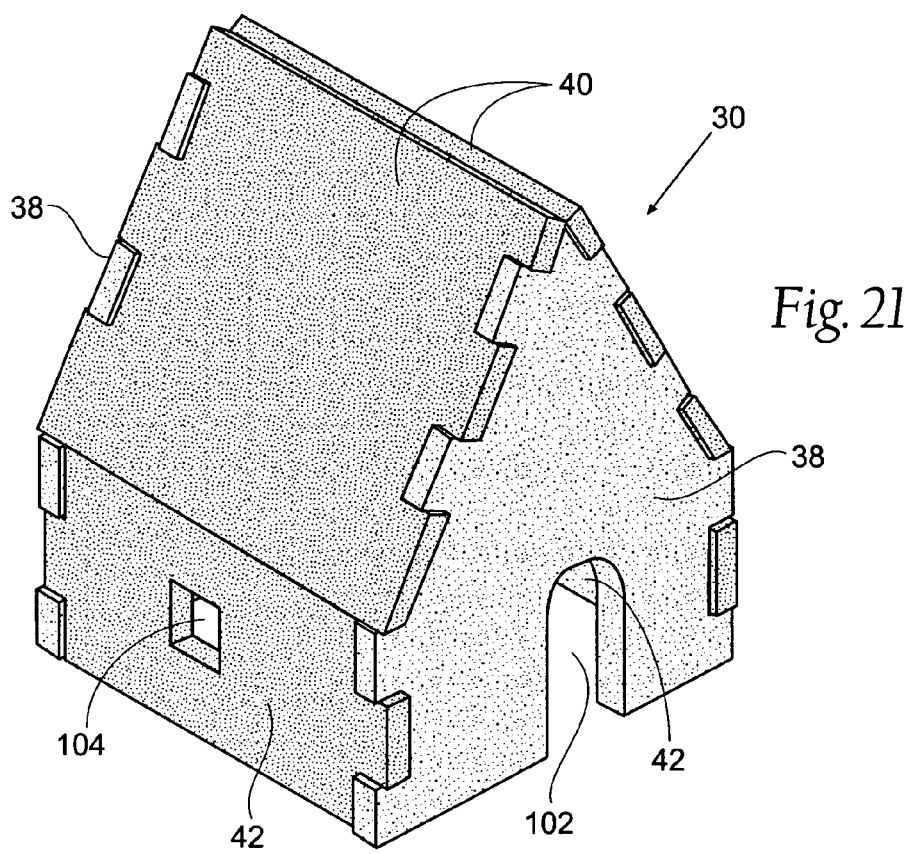
FIG. 21 is a perspective view of an alternative embodiment of a decorative structure in which the side panel includes a window and the end panel includes a door.

Some users may desire that the structure 30 provide additional aesthetic elements. For example, in an alternative embodiment illustrated in FIGS. 19–21, end panel cutter 32 includes a door cutting surface 100 for cutting a door 102 in end panel 38. Similarly, side panel cutter 36 includes a window cutting surface 104 for cutting a window 106 in side panel 36. Cutting surfaces 100 and 104 may be tack welded to cutters 32 and 36 respectively. It is apparent that the number and placement of doors 102 and windows 106 may be varied to produce a structure 30 of the desired architecture. Kit 28 preferably incorporates a series of cutters 32/34/36 having the desired elements.

Figure 22:
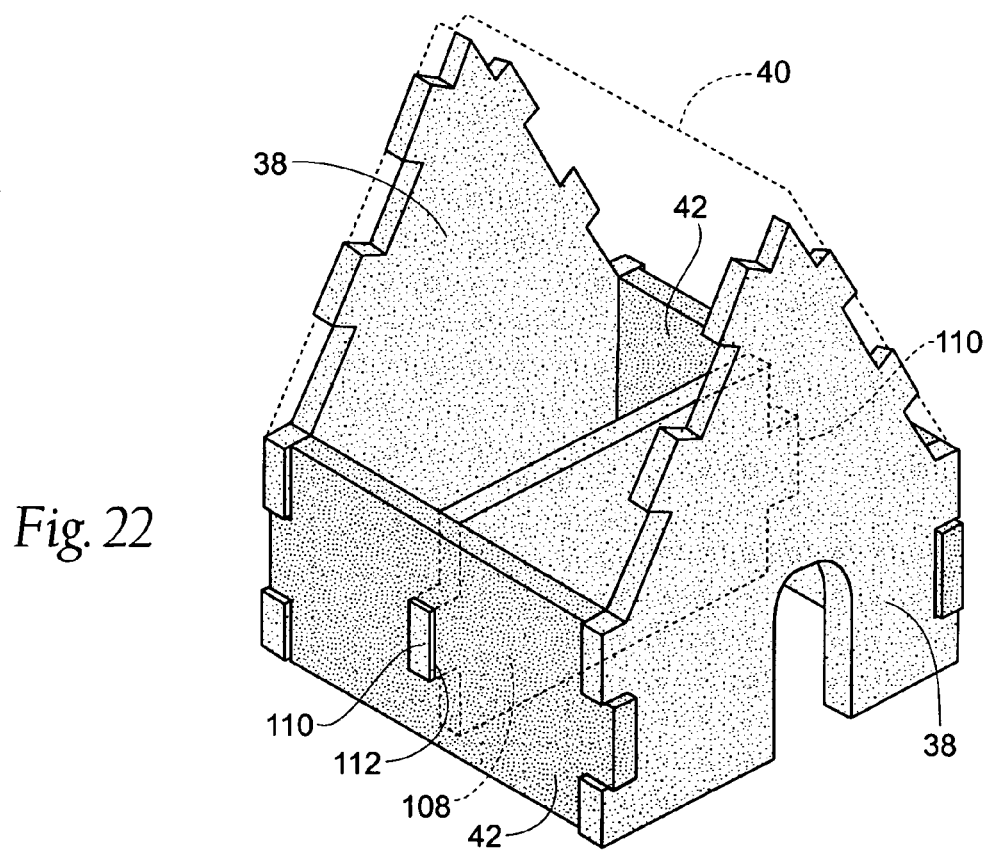
FIG. 22 is a perspective view of an alternative embodiment in which an interior panel is placed within the structure.

In the illustrated embodiment, the assembled structure 30 comprises first and second end panels 38, first and second roof panels 40, and first and second side panels 42. It is contemplated that the structure 30 may be varied by providing a greater or lesser number of top, end, or side panels 38/40/42 to create a structure 30 of virtually any configuration. In one alternative embodiment, a floor panel can be provided (not shown). As seen in FIG. 22, in cases where the interior of the house 30 is visible (e.g., by addition of a door 102), it may be desirable to provide an interior panel 108, formed with an interior panel cutter (not shown), or a series of interior panels 108 extending horizontally and/or vertically within the interior of the structure 30 to divide the interior of the structure 30, e.g., into rooms. To support the interior panels 108 within the structure, the interior panels 108 may include tabs 110 for interlocking with complementary slots 112 provided in one or more of panels 38/40/42.

Figure 23:
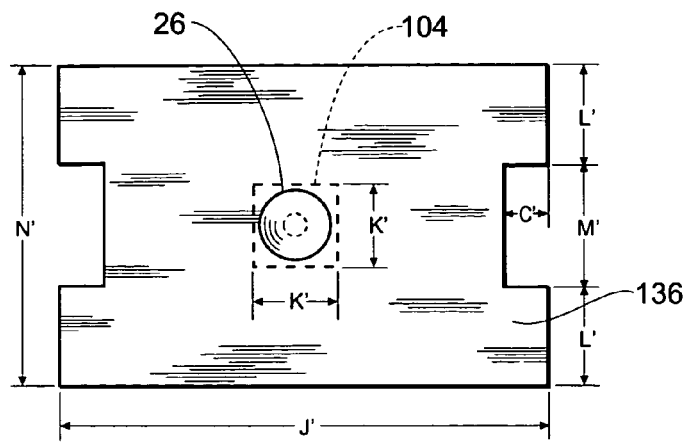
FIG. 23 is a schematic illustrating the dimensions of a side panel cutter in an alternative embodiment.
Figure 24:
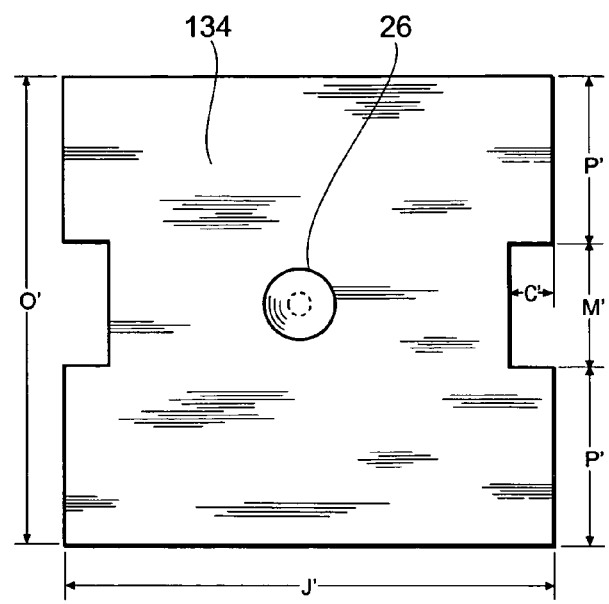
FIG. 24 is a schematic illustrating the dimensions of a roof panel cutter in an alternative embodiment.
Figure 25:
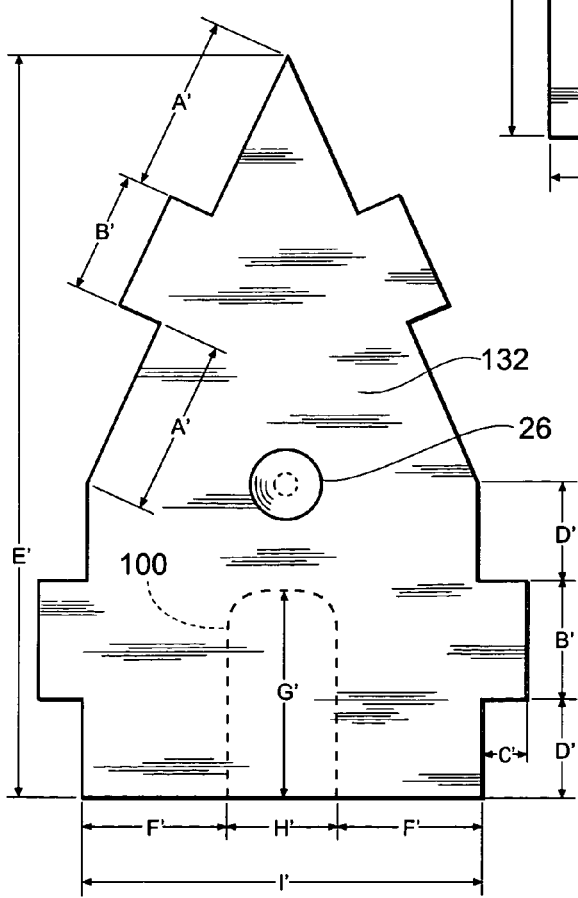
FIG. 25 is a schematic illustrating the dimensions of an end panel cutter in an alternative embodiment.

FIGS. 23–25 illustrate inner dimensions A'–N' for an end panel cutter 132, a roof panel cutter 134, and a side panel cutter 136 in an alternative embodiment as follows:

| | |
|---|---|
| A' | 1.406 inches |
| B' | .938 inch |
| C' | .375 inch |
| D' | .781 inch |
| E' | 5.880 inches |
| F' | 1.178 inches |
| G' | 1.673 inches |
| H' | .895 inch |
| I' | 3.25 inches |
| J' | 4.0 inches |
| K' | .750 inch |
| L' | .766 inch |
| M' | .968 inch |
| N' | 2.50 inches |
| O' | 3.75 inches |
| P' | 1.391 inches |

When dimensioned according to this representative embodiment, the necessary panels (two end panels 138, two roof panels 140, and two side panels 142) can be accommodated on a single standard 14 in.×16 in. cookie sheet 56.

Figure 26:
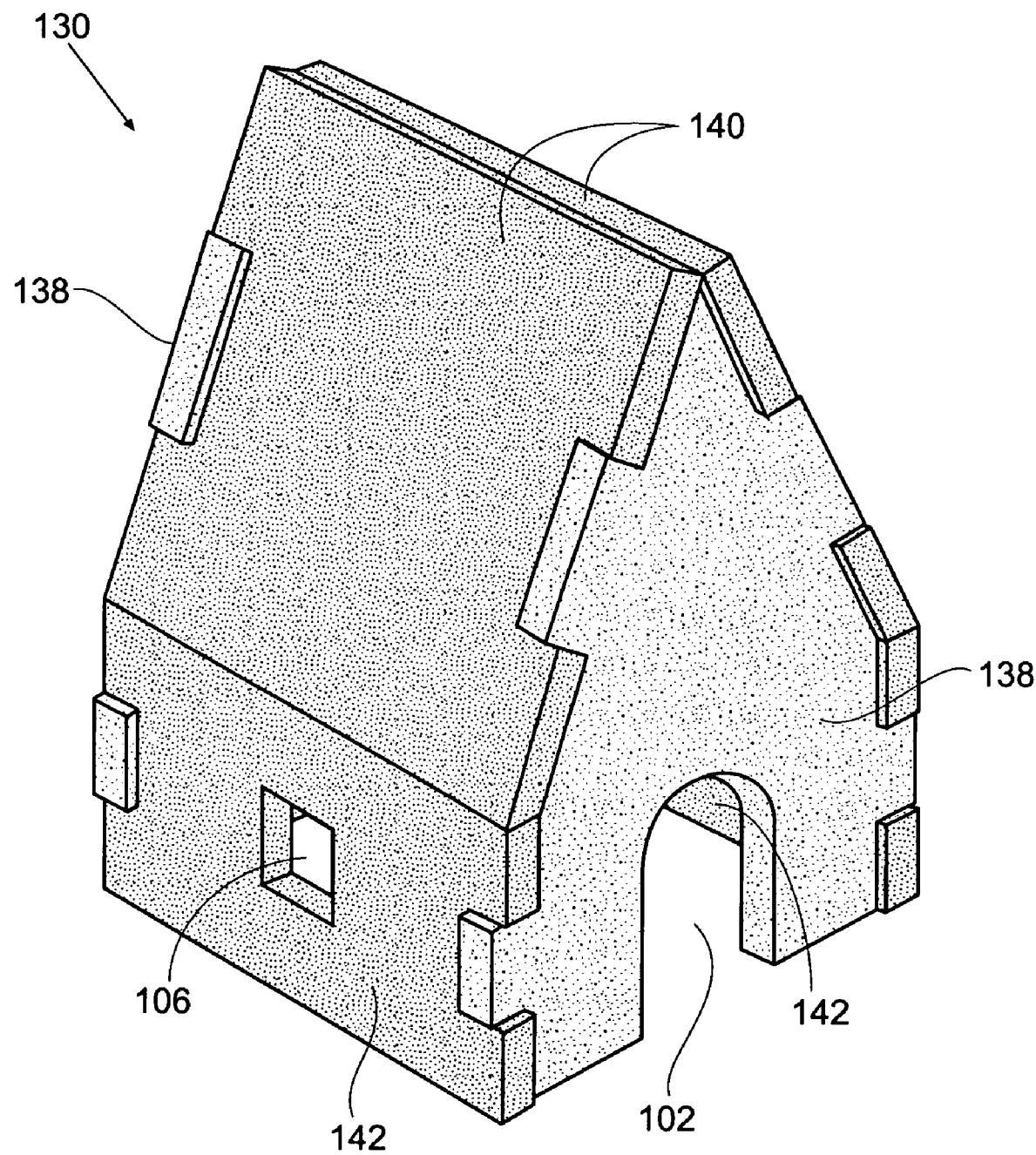
FIG. 26 is a perspective of a decorative structure constructed from panels formed by the cutters of FIGS. 23–25.

Cutters 132/134/136 have a tabbed arrangement similar to the embodiment illustrated in FIGS. 10–12. The tabbed arrangement allows the panels 132/134/136 to be assembled in an interlocking manner similar to the embodiment of FIGS. 13–17 to form a structure 130, as seen in FIG. 26.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A kit for creating a decorative house comprising:
   a device for creating an assembly of interlocking panels comprising a form having at least one side surface defining a tab and a notch and adapted to form a first panel having a corresponding tab and a corresponding notch, the tab of the first panel interlocking with a complementary notch on a second panel and the notch of the first panel interlocking with a complementary tab on a second panel;
   a decorating material: and
   a cookie sheet having at least two raised edges sized and configured to serve as dough depth gauges.

2. A kit as in claim 1 wherein the form is a cookie cutter.

3. A kit as in claim 1 wherein the first panel comprises an edible material.

4. A kit as in claim 1 wherein the first panel comprises a non-edible material.

5. A kit as in claim 1, further comprising instructions for use.

6. A kit as in claim 1, further comprising at least one dough depth gauge.

7. A kit as in claim 1, further comprising chocolate adapted to melted and poured into the form.

8. A kit as in claim 1, further comprising a dough mix.

* * * * *